United States Patent
Wood et al.

(10) Patent No.: US 11,988,300 B2
(45) Date of Patent: May 21, 2024

(54) PNEUMATIC ACTUATION VALVE ASSEMBLY

(71) Applicant: War Machine, Inc., Taylors, SC (US)

(72) Inventors: Michael Wood, Taylors, SC (US); Chris Vandenberghe, Taylors, SC (US)

(73) Assignee: War Machine, Inc., Taylors, SC (US)

( * ) Notice: Subject to any disclaimer, the term of this patent is extended or adjusted under 35 U.S.C. 154(b) by 11 days.

(21) Appl. No.: 18/057,213

(22) Filed: Nov. 20, 2022

(65) Prior Publication Data

US 2023/0083323 A1 Mar. 16, 2023

Related U.S. Application Data

(63) Continuation of application No. 17/065,915, filed on Oct. 8, 2020, now Pat. No. 11,536,391.

(60) Provisional application No. 62/912,487, filed on Oct. 8, 2019.

(51) Int. Cl.
*F41B 11/721* (2013.01)
*F16K 31/16* (2006.01)

(52) U.S. Cl.
CPC ............ *F16K 31/16* (2013.01); *F41B 11/721* (2013.01)

(58) Field of Classification Search
CPC ........ F16K 31/16; F41B 11/721; F41B 11/72; F41B 11/73; F41B 11/00
USPC .... 124/3, 63, 64, 65, 66, 67, 69, 71–73, 75, 124/76, 77
See application file for complete search history.

(56) References Cited

U.S. PATENT DOCUMENTS

| | | | |
|---|---|---|---|
| 5,881,707 A | 3/1999 | Gardner, Jr. | |
| 5,967,133 A | 10/1999 | Gardner, Jr. | |
| 6,035,843 A | 3/2000 | Smith et al. | |
| 6,474,326 B1 | 11/2002 | Smith et al. | |
| 6,637,421 B2 | 10/2003 | Smith et al. | |
| 6,644,295 B2 | 11/2003 | Jones | |
| 6,889,682 B2 | 5/2005 | Styles et al. | |
| 7,100,593 B2 | 9/2006 | Smith et al. | |
| 7,461,646 B2 | 12/2008 | Jones | |
| 7,603,997 B2 | 10/2009 | Hensel et al. | |

(Continued)

FOREIGN PATENT DOCUMENTS

| DE | 102008051624 B4 * | 5/2016 | .......... F16K 11/0712 |
|---|---|---|---|
| EP | 0254891 | 10/1990 | |

(Continued)

*Primary Examiner* — John Cooper
(74) *Attorney, Agent, or Firm* — Kim and Lahey Law Firm, LLC; Douglas W. Kim

(57) ABSTRACT

This system is a pneumatic actuation valve assembly that can include a frame; a timing spool housing; a timing spool carriage; a timing spool; a magnet configured to bias the timing spool in a forward position; a main spool and configured to travel toward a frame forward portion when a fluid is received into a mid-main spool pressure area wherein the main spool actuates a bolt carried by the frame and is configured to receive a projectile in an open position and chamber the projectile in a closed position; and, a bore defined in the timing spool configured to allow pressure in a rear main spool pressure area to escape through the bore releasing rearward pressure on the timing spool allowing the timing spool to travel from the rearward position to the forward position according to an attraction of the magnet.

20 Claims, 9 Drawing Sheets

(56) References Cited

U.S. PATENT DOCUMENTS

| | | | |
|---|---|---|---|
| 7,610,908 B2 | 11/2009 | Garder, Jr. et al. | |
| 7,762,248 B1 * | 7/2010 | Squire | F41B 11/00 124/80 |
| 7,866,308 B2 | 1/2011 | Jones et al. | |
| 7,882,830 B1 * | 2/2011 | Gabrel | F41B 11/723 124/75 |
| 7,946,285 B2 | 5/2011 | Gardner, Jr. et al. | |
| 8,555,868 B2 | 10/2013 | Dobbins | |
| 10,642,044 B2 | 5/2020 | Ouderkirk et al. | |
| 2005/0000505 A1 * | 1/2005 | Pedicini | F04B 9/02 124/63 |
| 2005/0188973 A1 * | 9/2005 | Monks | F41B 11/50 124/42 |
| 2005/0188974 A1 * | 9/2005 | Pedicini | F04B 35/01 124/65 |
| 2006/0005823 A1 | 1/2006 | Quinn et al. | |
| 2006/0005825 A1 * | 1/2006 | Monks | F41B 11/57 124/77 |
| 2006/0027221 A1 * | 2/2006 | Farrell | F41B 11/723 124/31 |
| 2006/0037597 A1 | 2/2006 | Wood | |
| 2007/0028909 A1 | 2/2007 | Wood | |
| 2007/0062509 A1 * | 3/2007 | Campo | F41B 11/71 124/73 |
| 2007/0215135 A1 * | 9/2007 | Campo | F41B 11/71 124/77 |
| 2007/0227519 A1 | 10/2007 | Wood | |
| 2008/0173291 A1 * | 7/2008 | Halmone | F41B 11/721 124/71 |
| 2009/0101129 A1 | 4/2009 | Wood et al. | |
| 2011/0232618 A1 * | 9/2011 | Gabrel | F41B 11/723 124/73 |
| 2021/0381798 A1 * | 12/2021 | Witzigreuter | F41B 11/71 |

FOREIGN PATENT DOCUMENTS

| | | | |
|---|---|---|---|
| JP | 5967133 B2 * | 8/2016 | H02K 11/00 |
| WO | 1997026498 | 7/1997 | |
| WO | WO-2007064913 A2 * | 6/2007 | F41B 11/723 |
| WO | 2008097265 | 8/2008 | |

* cited by examiner

PNEUMATIC ACTUATION VALVE ASSEMBLY

REFERENCE TO RELATED APPLICATIONS

This application claims priority on U.S. patent application Ser. No. 17/065,915 filed Oct. 8, 2020 which in turn is a non-provisional patent application claiming priority from U.S. Provisional Patent Application Ser. No. 62/912,487 filed Oct. 8, 2019, both titled PNEUMATIC ACTUATION VALVE ASSEMBLY and both incorporated herein by reference.

BACKGROUND OF THE ASSEMBLY

1) Field of the Assembly

This assembly is directed to a pneumatic actuation valve assembly for using gas to apply force on an object such as a projectile.

2) Description of the Related Art

When reviewing pneumatic actuation valves, especially in applications such as paintball guns, paintball markers, shirt guns, there are basically two types, electrical and mechanical. Generally, mechanical guns are more reliable and need little regular maintenance. They are generally easy to disassemble, and replacement parts are generally inexpensive. Only basic mechanical skill is needed to perform most maintenance on these mechanical platforms. However, these mechanical guns are typically not as fast, accurate, or consistent as electronic guns. The exact amount of air that propels the paintball from the barrel varies from shot to shot and the speed of the ball can vary effecting accuracy. Mechanical guns must be cocked before they can be fired and typically require a higher fluid (e.g., compressed air) pressure to operate resulting in fewer shots per tank of air. Examples of these prior attempts at paintball guns and shirt guns are shown in U.S. Pat. Nos. 6,361,460 and 7,624,726; United States Patent Applications Publication 2007/0028909 and 2009/0101129 and International Patent Application PCT/US07/16582.

In contrast, electric guns typically are smaller and lighter. Since the activation of the firing cycle is with electronic circuitry, the trigger pull can be light and is not reliant upon the pressure in the platform. However, disadvantages include increased difficulty to repair and usually require professional servicing. Moisture in the electronics can harm and even destroy the electric gun so that they are adversely affected by certain environmental conditions (e.g. rain, high humidity, etc.). Examples of electric guns can be found in U.S. Pat. Nos. 7,882,830; 6,889,682 and 6,520,172.

It is an object of the present invention to provide for a pneumatic actuation valve assembly that has an improved fire rate, has a lighter trigger pull and is generally light weight.

BRIEF SUMMARY OF THE ASSEMBLY

The above objectives are accomplished by providing a pneumatic actuation valve assembly comprising: a frame; a timing spool housing received in the frame; a timing spool carriage received in the timing spool housing; a timing spool slidably received in the timing spool carriage and disposed at a frame rear portion; a magnet disposed in the timing spool housing disposed adjacent to a timing spool front end and configured to hold the timing spool in a forward position at a first phase of an operating cycle and a rearward position at a second phase of the operating cycle; a main spool at least partially received in the timing spool housing and configured to travel toward a frame forward portion when a fluid is received into a mid-main spool pressure area wherein the main spool actuates a bolt carried by the frame and configured to receive a projectile in an open position and chamber the projectile in a closed position; and, a bore defined in the timing spool configured to allow pressure in a rear main spool pressure area to escape through the bore releasing rearward pressure on the timing spool allowing the timing spool to travel from the rearward position to the forward position according to an attraction of the magnet.

A pressurized fluid source can be in fluid communications with a rear frame opening; and an actuator can be directly or indirectly attached to the frame and configured to allow pressurized fluid from the pressurized fluid source to enter a timing spool pressure area. A first timing spool carriage opening defined in the timing spool carriage can be configured to avow pressurized fluid to enter the rear main spool pressure area and force the main spool toward the frame forward portion. A bolt can be disposed in the frame wherein the main spool is configured to force the bolt forward when pressurized fluid enters a bolt pressure area, when the main spool travels toward a frame front portion included in the frame. When the bolt goes through the operating cycle, the bolt can be in a rear position allowing a projectile to enter a chamber, travel forward to close the chamber allowing pressurized fluid to eject the projectile from a barrel or other component. The bolt can also be operated manually with the timing spool and its associated components used to eject a projectile. The projectile can be compressed fluid such as air, liquid, solid, paint ball ammunition, shirt, and other articles.

A spring can be disposed in the frame and configured to move the bolt rearward when pressure in the bolt pressure area is released.

A first timing spool diameter can be included in the timing spool and disposed at a timing spool forward end and a second timing spool diameter disposed at a timing spool rearward end where the first timing spool diameter can be less than the second timing spool diameter in one embodiment, A forward bolt seal can be included in the frame having a forward bolt seal diameter configured to determine an amount of pressure to eject a projectile according to the size of the forward bolt seal diameter.

The pneumatic actuation valve assembly can include a frame; a timing spool received in the frame; a magnet disposed in the frame adjacent to a timing spool front end and configured to bias the timing spool in a forward position; a main spool disposed in the frame and configured to travel toward a frame forward portion when a fluid is received into a mid-main spool pressure area; and a bore defined in the timing spool configured to avow pressure in a rear main spool pressure area to escape through the bore releasing rearward pressure on the timing spool allowing the timing spool to travel from a rearward position to the forward position according to an attraction of the magnet.

An actuator can be attached to the frame configured to allow pressurized fluid to enter a timing spool pressure area. The actuator can be a trigger assembly. The fluid can be compressed air. The system can include a timing spool disposed in the frame configured to actuate a main spool disposed in the frame to travel toward a frame forward portion when a fluid is received into a mid-main spool pressure area; a magnet disposed in the frame configured to bias the timing spool toward the frame forward portion; and a bore defined in the timing spool configured to allow pressure in a rear main spool pressure area to escape through the bore releasing pressure on the timing spool allowing the timing spool to travel from a rearward position to a forward position. The timing spool housing can be received into the frame and configured to avow pressurized fluid to enter the timing spool housing and to be directed to a timing spool pressure area. A main spool can be received in the timing spool housing and configured to receive the pressurized fluid into a rear main spool pressure area to actuate the main spool toward a frame forward portion; and a bolt can be received into the frame and configured to travel toward the forward frame portion when the pressurized fluid enters as bolt pressure area.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1:
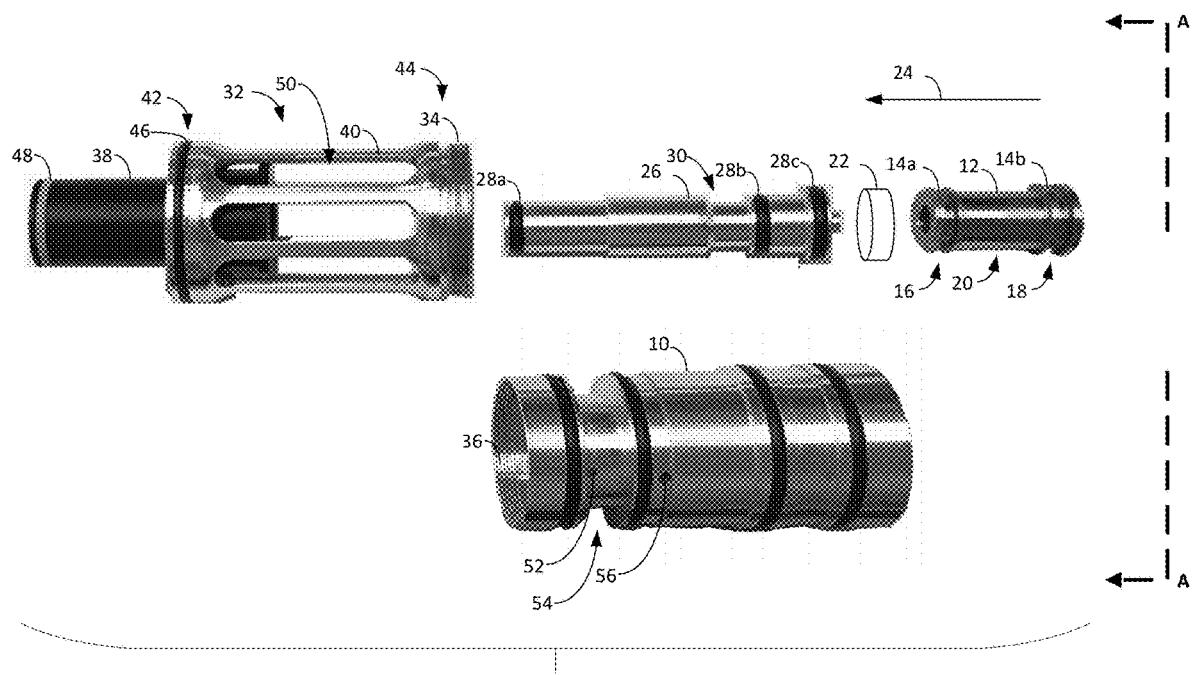
FIG. 1 is a schematic of various aspects of the assembly.

Referring to FIG. 1, a timing spool housing 10 is shown for containing various components of the assembly. A timing spool 12 can be disposed in the timing spool housing and be slidably carried by the timing spool housing. The timing spool can have recesses such as a forward recess 14a and a rearward recess 14b for one or more seals such as O-rings. The timing spool can include a timing spool forward end 16 that can include a first timing spool diameter. The timing spool can include a timing spool rearward end 18 that can have a second diameter. The first diameter can be less than the second diameter. A timing spool pressure area 20 can be defined in the timing spool and can be disposed between the forward end and the rearward end.

A magnet 22 can be disposed in the timing spool housing and can bias the timing spool in a forward direction 24. A main spool 26 can be disposed in the timing spool housing and be slidably carried by the timing spool housing. The main spool can include recesses for receiving seals such as O-rings including a first main seal 28a, a second main seal 28b and a third main seal 28c. The main spool can include a mid-main spool pressure area 30 for receiving and releasing pressured fluid (e.g., gases) during in functional cycle. The main spool can be partially received on the timing spool housing.

A bolt assembly 32 can be carried by the timing spool housing. The bolt assembly can be removably attached to the timing spool housing 10. The attachment can be by a threaded area 34 with corresponding threads 36 in the timing spool housing in one embodiment. A bolt 38 can be included in the bolt assembly and slidably carried in a bolt housing 40. The bolt housing can include a bolt forward end 42 and a bolt rearward end 44. A bolt housing seal 46 can be included in the bolt assembly. The bolt can include a bolt seal 48 and can be included with the bolt. The bolt housing can include slots 50 defined in the housing allowing fluid to flow externally and internally to the bolt housing.

The timing bolt housing can include a first timing spool housing opening 52, a timing spool housing pressure area 54 and a second timing spool housing opening 56.

Figure 2:
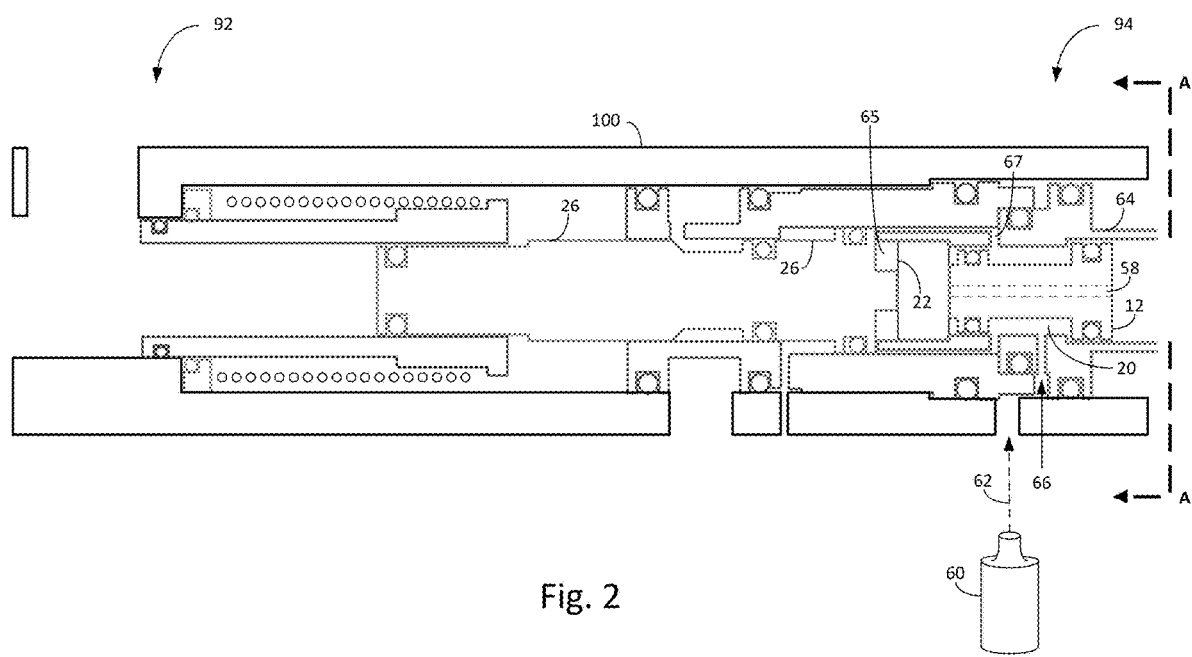
FIG. 2 is a cross section along lines A-A of FIG. 1.

Referring to FIG. 2, frame 100 is shown for carrying the various components of the pneumatic actuation valve assembly. The timing spool 12, having a bore 58, is shown in a forward position against magnet 22. When a trigger assembly is actuated, compressed fluid (e.g., air or $CO_2$) enters the timing spool pressure area 20 from fluid source 60 through rear frame opening 62 and into a timing spool carriage 64 through a first timing spool carriage opening 66 filling timing spool pressure area 20. The pressure in the timing spool pressure area leaves the timing spool carriage and enters the timing spool housing through a second timing spool carriage opening 67. Pressure is then delivered to a rear main spool pressure area 65 forcing the main spool 26 toward a frame forward portion 92 opposite a frame rear portion 94.

The trigger assembly can include a trigger that can actuate a value between a fluid pressure container and the frame so that when the trigger is actuated, pressurized fluid exits the fluid container and enters one or more of the pressure areas described herein.

Figure 3:
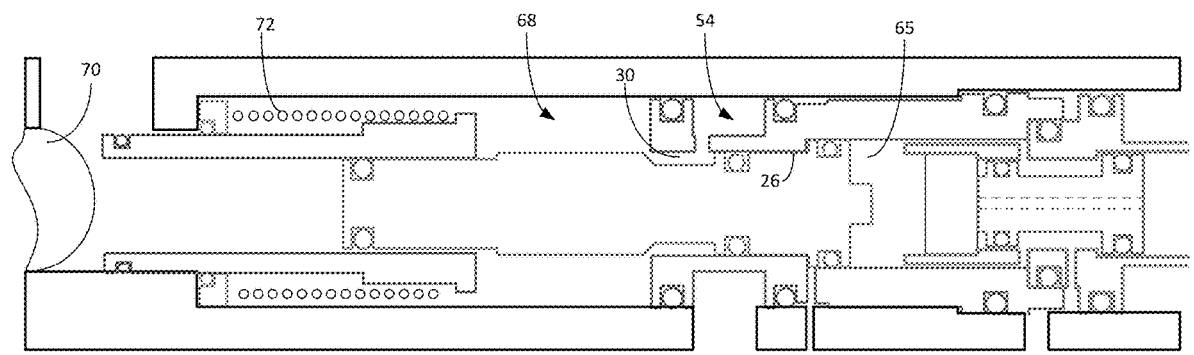
FIG. 3 is a cross section along lines A-A of FIG. 1.

Referring to FIG. 3, the main spool 26 is moved forward and fluid (e.g. compressed air) travels from a timing spool pressure area 54, into the mid main spool pressure area 30 and into bolt pressure area 68. This pressure forces the bolt forward and chambers a projectile 70. The pressures overcome bolt spring 72 allowing the bolt to travel forward.

Figure 4:
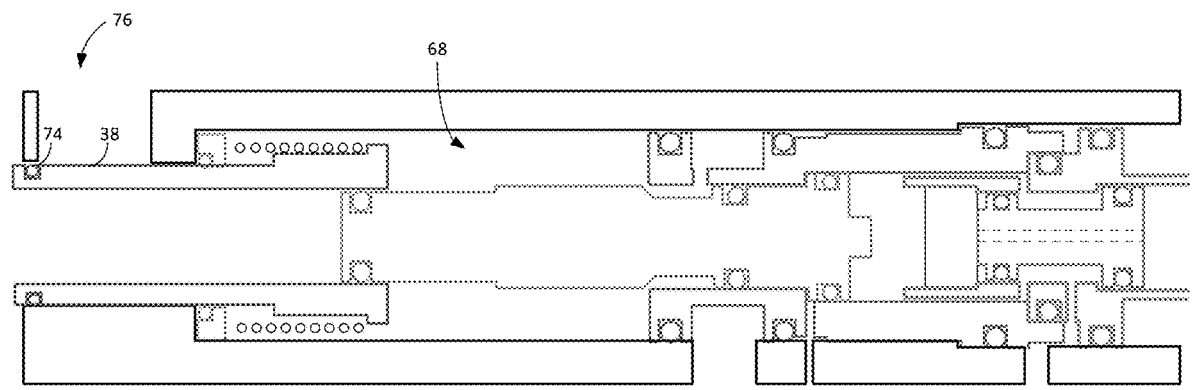
FIG. 4 is a cross section along lines A-A of FIG. 1.

Referring to FIG. 4, bolt 38 is in a forward position closing the bolt. Bolt seal 74 prevents pressure from backflowing into the projectile feeding area 76 or rearward of the projectile feeding area. The projectile is forward with the bolt in the chamber. The bolt pressure area 68 remains pressurized and the main spool 26 is in the forward position.

Figure 5:
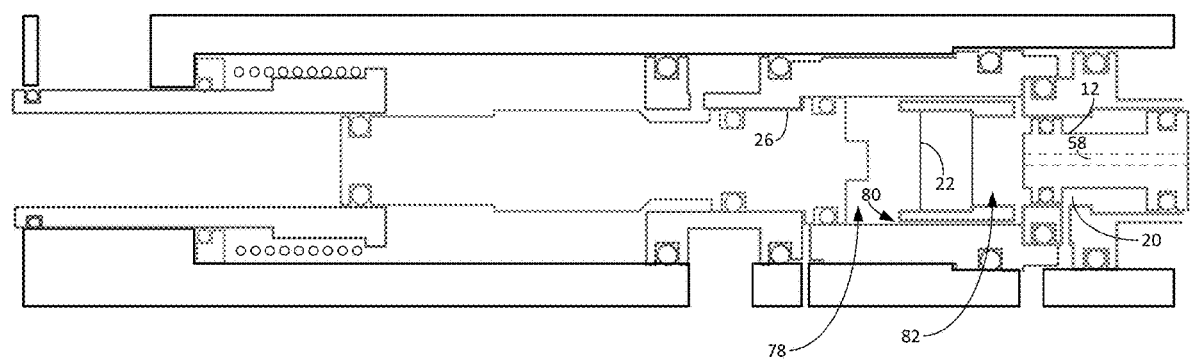
FIG. 5 is a cross section along lines A-A of FIG. 1.

Referring to FIG. 5, pressure that is delivered from the pressure source into timing spool pressure area 20, at sufficient pressure, positions the timing spool rearward allowing the fluid rearward of the main spool 26, in area 78 to escape along path 80 into an area forward of the timing spool and rear the main spool. The pressure in timing spool pressure area 20 is sufficient to overcome the attraction force of magnet 22 allowing the timing spool to travel rearward allowing fluid to escape from area 82 out bore 58.

Figure 6:
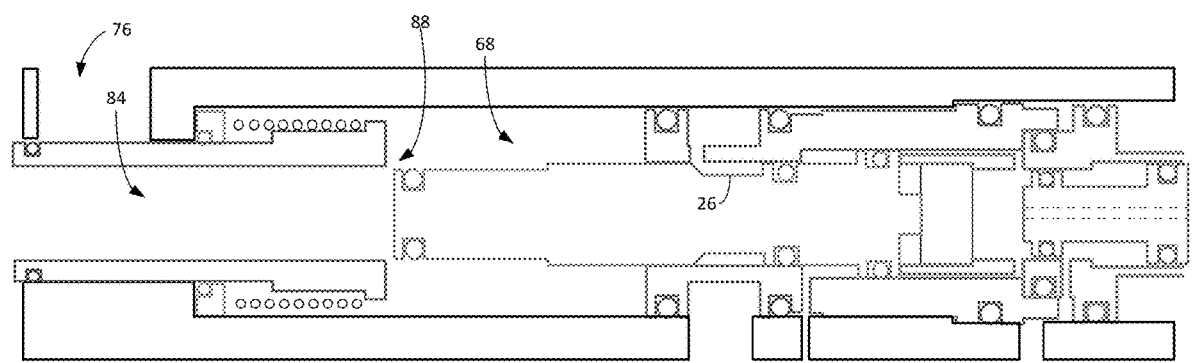
FIG. 6 is a cross section along lines A-A of FIG. 1.

Referring to FIG. 6, pressure is then relieved from behind the main spool and the main spool is positioned rearward. Pressure in bolt pressure area 68 escapes around the main spool into the bolt bore 84 through space 88 thereby forcing the projectile out chamber.

Figure 7:
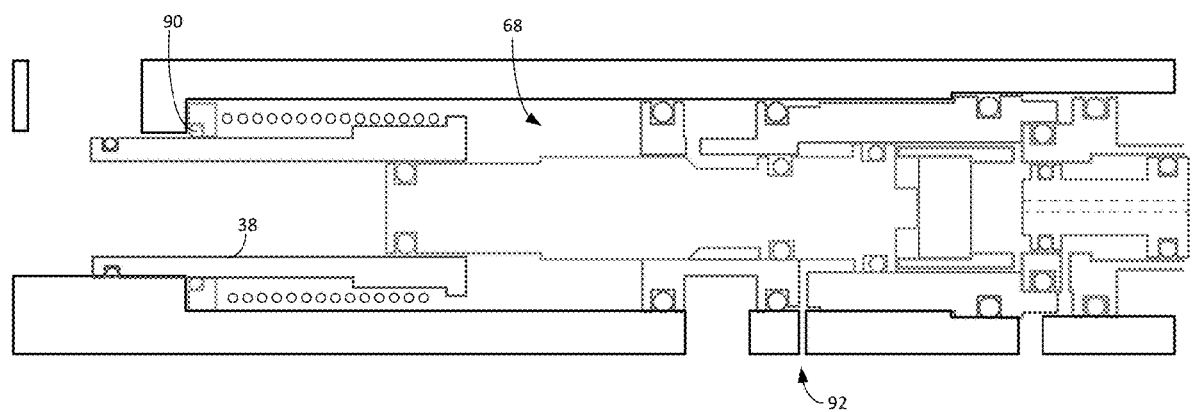
FIG. 7 is a cross section along lines A-A of FIG. 1.

Referring to FIG. 7, once the pressure is relieved from the bolt 38 pressure area 68 the pressure is reduced so that the bolt spring travels into the rearward position.

Figure 8:
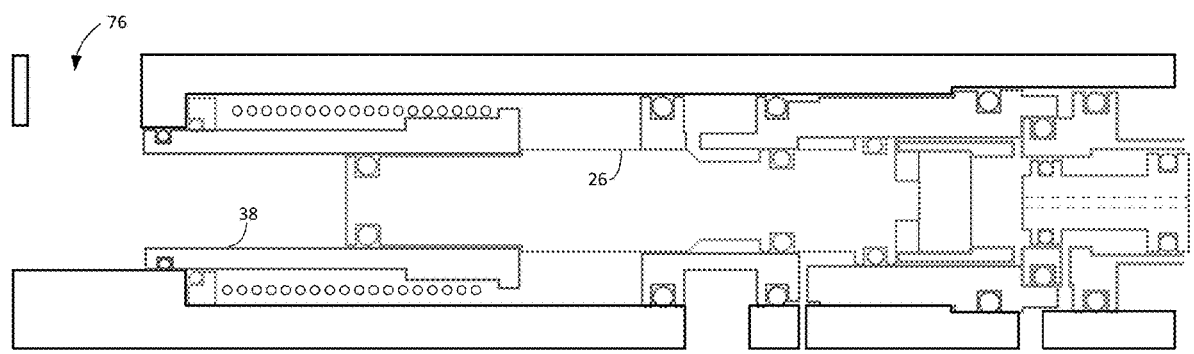
FIG. 8 is a cross section along lines A-A of FIG. 1; and,
FIG. 9 is a cross section along lines A-A of FIG. 1.

Referring to FIG. 8, bolt 68 is in the rearward position and the main spool 26 is in the rearward position. Projectile feeding area 76 is no longer obstructed by the bolt allowing a projectile to be positioned forward of the bolt.

Figure 9:
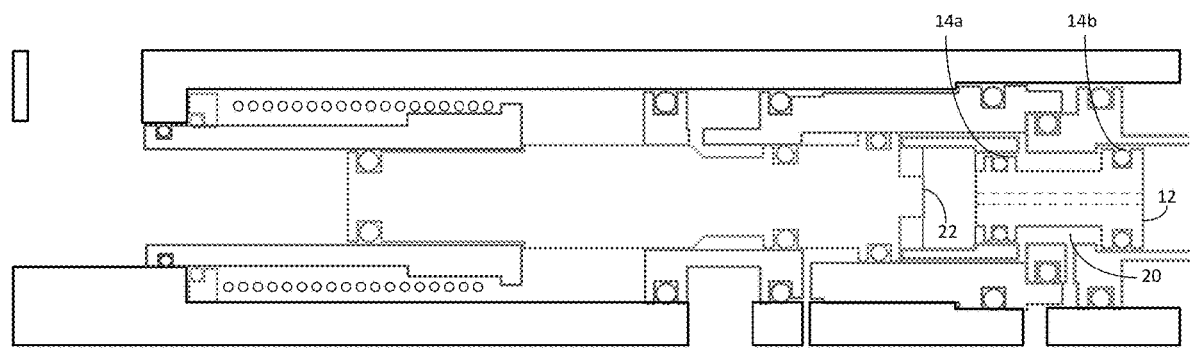

Referring to FIG. 9, when the pressure is relieved from the timing spool pressure area 20, the timing spool 12 is attracted to the magnet 22 and positioned forward.

The diameter of the timing spool recesses 14a and 14b and the ratio between these two recesses (e.g., diameter 14a: diameter 14b) can be modified to change the pressures required to release the timing spool from the magnet thereby changing the speed in which the timing spool will initiate the cycles described herein. The amount of pressure used to eject the projectile can be modified by changing the diameter of a forward bolt seal 90. An exhaust port 92 can be included to allow fluid to escape during the operating cycles as described herein.

The cycle can repeat. When viewing FIGS. 1-9 it can be seen that the figures represent an operational cycle that can be configured to receive a projectile and eject a projectile from a chamber.

The assembly can also be used for other applications where the opening and closing of an action and the injection or expulsion of compressed gas with a system that cycles quickly is needed. The assembly described herein can be a weapon platform such as a paint ball action for a pistol or rifle, pellet gun or BB gun. The assembly described herein can be used for tools such as nail guns, rivet drivers and other applications using impact or compression force for operation and construction.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A pneumatic actuation valve assembly comprising:
a frame;
a timing spool received in the frame and disposed at a frame rear portion;
a magnet disposed in the frame adjacent to a timing spool front end and configured to hold the timing spool in a forward position at a first phase of an operating cycle and configured to release the timing spool upon an application of a pressure at a second phase of an operating cycle; and,
a main spool received in the frame and configured to travel toward a frame forward portion wherein the main spool actuates a bolt carried by the frame and configured to receive a projectile in an open position and chamber the projectile in a closed position.

2. The assembly of claim 1 including a bore defined in the timing spool configured to allow pressure in a rear main spool pressure area to escape through the bore thereby releasing rearward pressure on the timing spool and allowing the timing spool to travel from the rearward position to the forward position according to an attraction of the magnet.

3. The assembly of claim 1 including:
an actuator configured to allow pressurized fluid to enter a timing spool pressure area.

4. The assembly of claim 3 including a first frame opening defined in the frame configured to allow pressurized fluid to enter a rear main spool pressure area and force the main spool toward the frame forward portion.

5. The assembly of claim 1 wherein the main spool is configured to force the bolt forward when pressurized fluid enters a bolt pressure area when the main spool travels toward a frame front portion included in the frame.

6. The assembly of claim 1 wherein the bolt is configured to receive pressured fluid from a bolt pressure area into a bore defined in a barrel and carried by the frame to eject a projectile.

7. The assembly of claim 1 including a spring disposed in the frame configured to move the bolt rearward when pressure in a bolt pressure area is released.

8. The assembly of claim 1 including a forward bolt seal included in the frame having a forward bolt seal diameter configured to determine an amount of pressure to eject a projectile according to a size of the forward bolt seal diameter.

9. The assembly of claim 1 wherein the frame is included in a T-shirt gun frame.

10. The assembly of claim 1 wherein the frame is included in a paintball gun.

11. A pneumatic actuation valve assembly comprising:
a frame;
a timing spool received in the frame;
a magnet disposed in the frame adjacent to a timing spool front end and configured to bias the timing spool in a forward position and release the timing spool upon an application of pression upon the timing spool; and,
a main spool disposed in the frame and configured to travel toward a frame forward portion when a fluid is received into a mid-main spool pressure area.

12. The assembly of claim 11 including a bore defined in the timing spool configured to allow pressure in a rear main spool pressure area to escape through the bore releasing rearward pressure on the timing spool allowing the timing spool to travel from a rearward position to the forward position.

13. The assembly of claim 11 including a bolt received in the frame and wherein the main spool is configured to actuate the bolt to receive a projectile into a chamber defined in the frame when the bolt is in an open position.

14. The assembly of claim 11 including an actuator attached to the frame configured to allow pressurized fluid to enter a timing spool pressure area.

15. The assembly of claim 14 wherein the actuator is a trigger assembly.

16. The assembly of claim 11 wherein the main spool is configured to force a bolt, carried by the frame, forward when pressurized fluid enters a bolt pressure area when the main spool travels toward a frame front portion included in the frame.

17. A pneumatic actuation valve assembly comprising:
a frame;
a timing spool disposed in the frame configured to actuate a main spool disposed in the frame to travel toward a frame forward portion when a fluid is received into a mid-main spool pressure area; and,
a magnet disposed in the frame configured to bias the timing spool toward the frame forward portion.

18. The assembly of claim 17 including:
a bore defined in the timing spool configured to allow pressure to escape through the bore releasing the timing spool to travel from a rearward position to a forward position.

19. The assembly of claim 18 including a timing spool carriage received in the frame wherein the timing spool is slidably received into the timing spool carriage.

20. The assembly of claim 17 including:
a timing spool housing received into the frame and configured to allow pressurized fluid to enter the timing spool housing and to be directed to a timing spool pressure area;
a main spool received in the timing spool housing and configured to receive the pressurized fluid into a rear main spool pressure area to actuate the main spool toward a frame forward portion; and,
a bolt received into the frame and configured to travel toward the forward frame portion when the pressurized fluid enters as bolt pressure area.

\* \* \* \* \*